(12) United States Patent
Lin

(10) Patent No.: US 8,291,815 B2
(45) Date of Patent: Oct. 23, 2012

(54) FULLY AUTOMATIC EGG ROLL MAKING MACHINE

(75) Inventor: Kuan-Tsung Lin, Dali (TW)

(73) Assignees: Kuan-Tsung Lin; Chia-Ching Lin, Taichung County; Hsin-Yu Lin, Dali (TW)

( * ) Notice: Subject to any disclaimer, the term of this patent is extended or adjusted under 35 U.S.C. 154(b) by 438 days.

(21) Appl. No.: 12/704,433

(22) Filed: Feb. 11, 2010

(65) Prior Publication Data

US 2011/0192289 A1 Aug. 11, 2011

(51) Int. Cl.
*A21C 9/06* (2006.01)
*A23P 1/00* (2006.01)

(52) U.S. Cl. ...................... 99/450.6; 99/450.7
(58) Field of Classification Search .............. 99/357, 99/450.1, 450.4, 450.6, 450.7, 484, 422, 99/423
See application file for complete search history.

(56) References Cited

U.S. PATENT DOCUMENTS

| | | | | |
|---|---|---|---|---|
| 3,633,517 A * | 1/1972 | Kao | | 99/450.6 |
| 3,669,007 A * | 6/1972 | Pulici | | 99/450.6 |
| 3,691,594 A * | 9/1972 | Klein | | 425/572 |
| 3,912,433 A * | 10/1975 | Ma | | 425/126.1 |
| 4,388,059 A * | 6/1983 | Ma | | 425/112 |
| 4,439,124 A * | 3/1984 | Watanabe | | 425/112 |
| 4,691,627 A * | 9/1987 | Roberts | | 99/450.6 |
| 4,913,043 A * | 4/1990 | Cheung | | 99/450.6 |
| 5,012,726 A * | 5/1991 | Fehr et al. | | 99/450.6 |
| 5,085,138 A * | 2/1992 | Fehr et al. | | 99/450.6 |
| 5,161,458 A * | 11/1992 | Cheung | | 99/450.6 |
| 5,289,761 A * | 3/1994 | Spierts et al. | | 99/450.6 |
| 6,257,127 B1 * | 7/2001 | Lin | | 99/353 |
| 6,355,288 B1 * | 3/2002 | DiGiacomo | | 426/282 |
| 2009/0205509 A1 * | 8/2009 | Canicas et al. | | 99/357 |

* cited by examiner

*Primary Examiner* — Sebastiano Passaniti
(74) *Attorney, Agent, or Firm* — Ladas & Parry, LLP

(57) ABSTRACT

An fully automatic egg roll making machine includes a machine bed, a loading device, a loading device disposed on the machine bed, a material-pouring unit for pouring a dough material onto a lower frying tray, a baking unit for baking the dough material on the lower frying tray to form a baked dough sheet on the lower frying tray, and a wrapping unit operable to allow the sheet to form an egg roll product. The baking unit includes two upper frying trays positioned such that, when one of the upper frying trays is moved to a working position for baking the dough material, the other one of the upper frying trays is moved to a non-working position whereat it can be cleaned easily and conveniently.

10 Claims, 11 Drawing Sheets

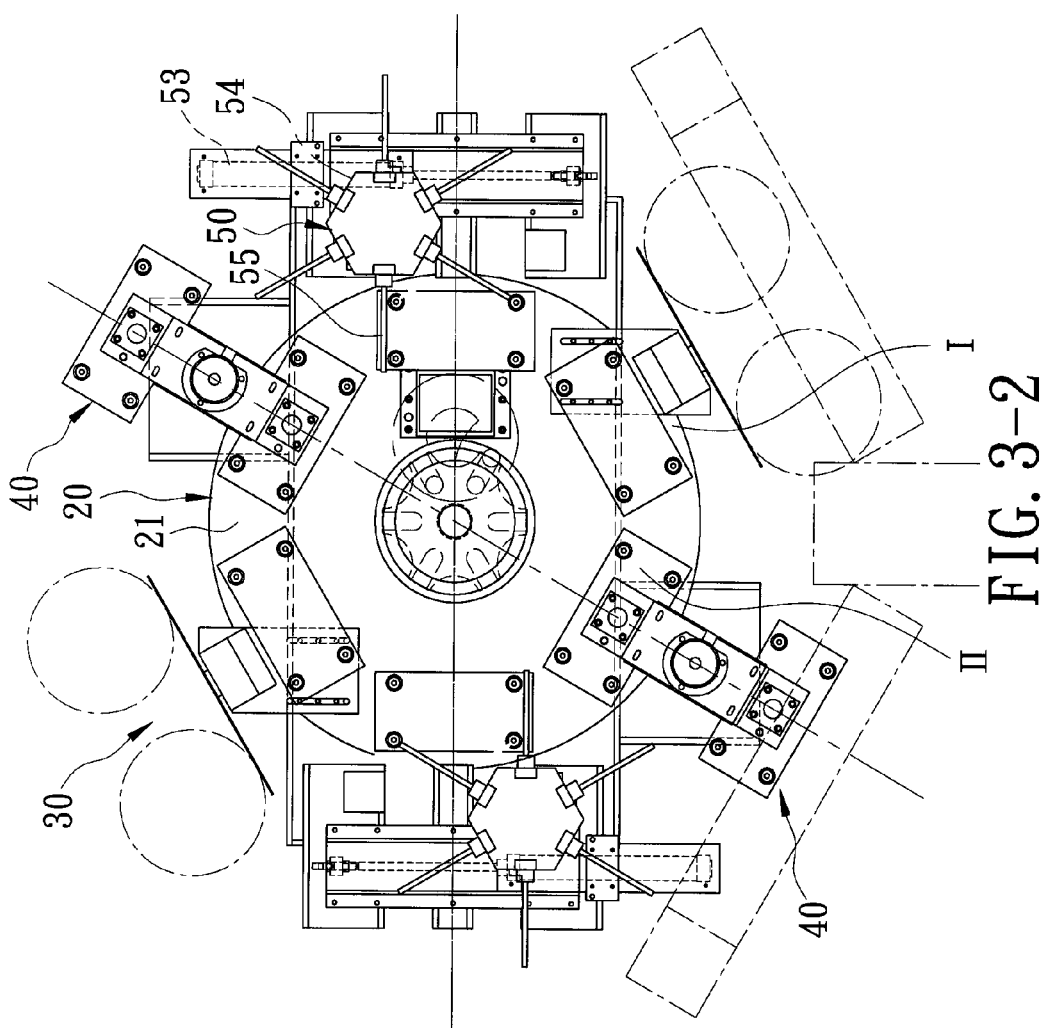

FULLY AUTOMATIC EGG ROLL MAKING MACHINE

BACKGROUND OF THE INVENTION

1. Field of the Invention

This invention relates to food making equipment, and more particularly to a fully automatic egg roll making machine.

2. Description of the Related Art

Referring to FIGS. 1 and 2, a conventional automatic egg roll making machine disclosed in Taiwanese Utility Model Publication No. M369660 by the applicant includes a driving motor 1, a Geneva drive mechanism 2 driven by the driving motor 1, an upper seat 3 connected to the Geneva drive mechanism 2, a pair of material-pouring units 4 each disposed adjacent to a periphery of the upper seat 3 and immediately downstream of a respective one of the material-pouring units 3, a pair of baking units 5 each disposed adjacent to the periphery of the upper seat 3 and immediately downstream of a respective one of the material-pouring units 4, and a pair of wrapping units 6 each disposed adjacent to the periphery of the upper seat 3 and immediately downstream of a respective one of the baking units 5. A plurality of lower frying trays 301 are disposed fixedly on the periphery of the upper seat 3. Each of the baking units 5 includes an upper frying tray 501, and a pressure cylinder 502. When one of the lower frying trays 301 is rotated to a position under the upper frying tray 501, the pressure cylinder 502 is operated to move the upper frying tray 501 toward and away from the one of the lower frying trays 301.

A drawback encountered by the aforesaid conventional automatic egg roll making machine is that, during the baking operation, baked dough is easily stuck on the upper frying trays 501, and if a portion of the baked dough is stuck on one of the upper frying trays 501, the egg roll making operation of the machine must be interrupted for cleaning the one of the upper frying trays 501, thereby reducing the production capacity of the machine.

SUMMARY OF THE INVENTION

The object of this invention is to provide a fully automatic egg roll making machine that includes a baking unit configured to allow baked dough stuck thereon to be removed without interrupting the egg roll making operation of the machine.

Accordingly, a fully automatic egg roll making machine of this invention comprises:

a machine bed;

a loading device including a rotary disk disposed rotatably on the machine bed, a plurality of equidistant lower frying trays disposed on the rotary disk, and a driving unit operable for driving intermittent rotation of the rotary disk on the machine bed in a predetermined direction;

a material-pouring unit disposed adjacent to a periphery of the rotary disk for pouring a dough material onto one of the lower frying trays when the one of the lower frying trays is rotated relative to the machine bed to a position aligned with the material-pouring unit;

a baking unit disposed adjacent to the periphery of the rotary disk and immediately downstream of the material-pouring unit for baking the dough material on the one of the lower frying trays to form a baked dough sheet when the one of the lower frying trays is rotated relative to the machine bed to be aligned with the baking unit, the baking unit including two upper frying trays rotatable relative to the machine bed such that, when the one of the lower frying trays is rotated to a position aligned with the baking unit, one of the upper frying trays is rotated to a standby position disposed directly above the one of the lower frying trays to subsequently move to a working position so as to abut against the one of the lower frying trays to thereby allow the dough material to be baked, thus forming the baked dough sheet, after which the one of the upper frying trays is returned to the standby position, and the other one of the upper frying trays is rotated to a non-working position that is misaligned from and away from the one of the lower frying trays; and a wrapping unit disposed adjacent to the periphery of the rotary disk and immediately downstream of the baking unit and operable to allow the sheet to form an egg roll product when the one of the lower frying trays is rotated relative to the machine bed to a position aligned with the wrapping unit.

Since the baking unit includes the two upper frying trays, when one of the upper frying trays is disposed at the working position for performing a baking operation, the other one of the upper frying trays is disposed at the non-working position to thereby allow baked dough stuck thereon to be removed. Consequently, when a portion of baked dough is truck on either of the upper frying trays, it can be removed without interrupting the egg roll making operation of the machine.

BRIEF DESCRIPTION OF THE DRAWINGS

These and other features and advantages of this invention will become apparent in the following detailed description of a preferred embodiment of this invention, with reference to the accompanying drawings, in which:

FIG. 3-1 is a top view of the preferred embodiment of an automatic egg roll making machine according to this invention, illustrating two mounting seats each disposed at a first position;

FIG. 3-2 is a view similar to FIG. 3-1 but illustrating the mounting seats each disposed at a second position;

DETAILED DESCRIPTION OF THE PREFERRED EMBODIMENT

Figure 1:
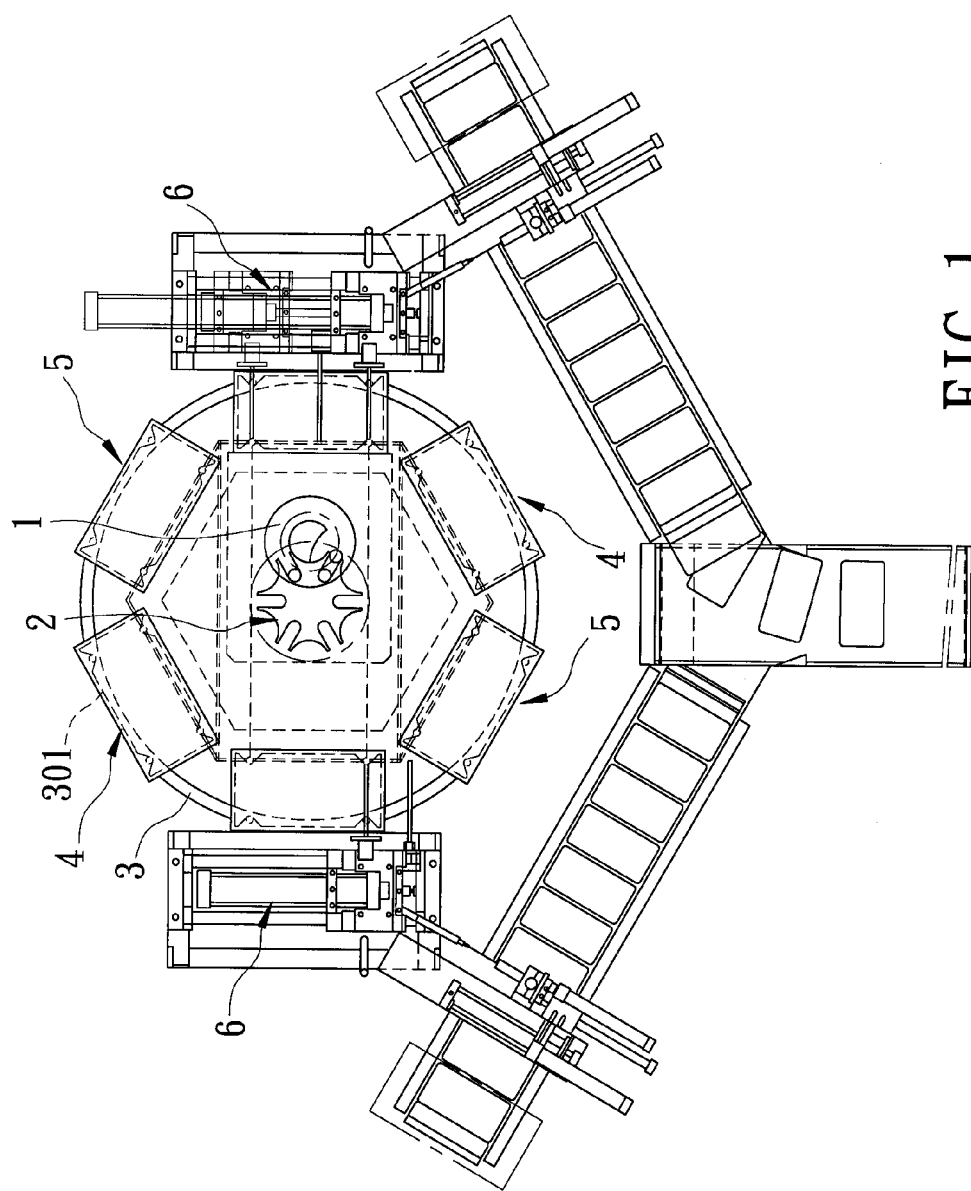
FIG. 1 is a top view of a conventional automatic egg roll making machine disclosed in Taiwanese Utility Model Publication No. M369660.
Figure 2:
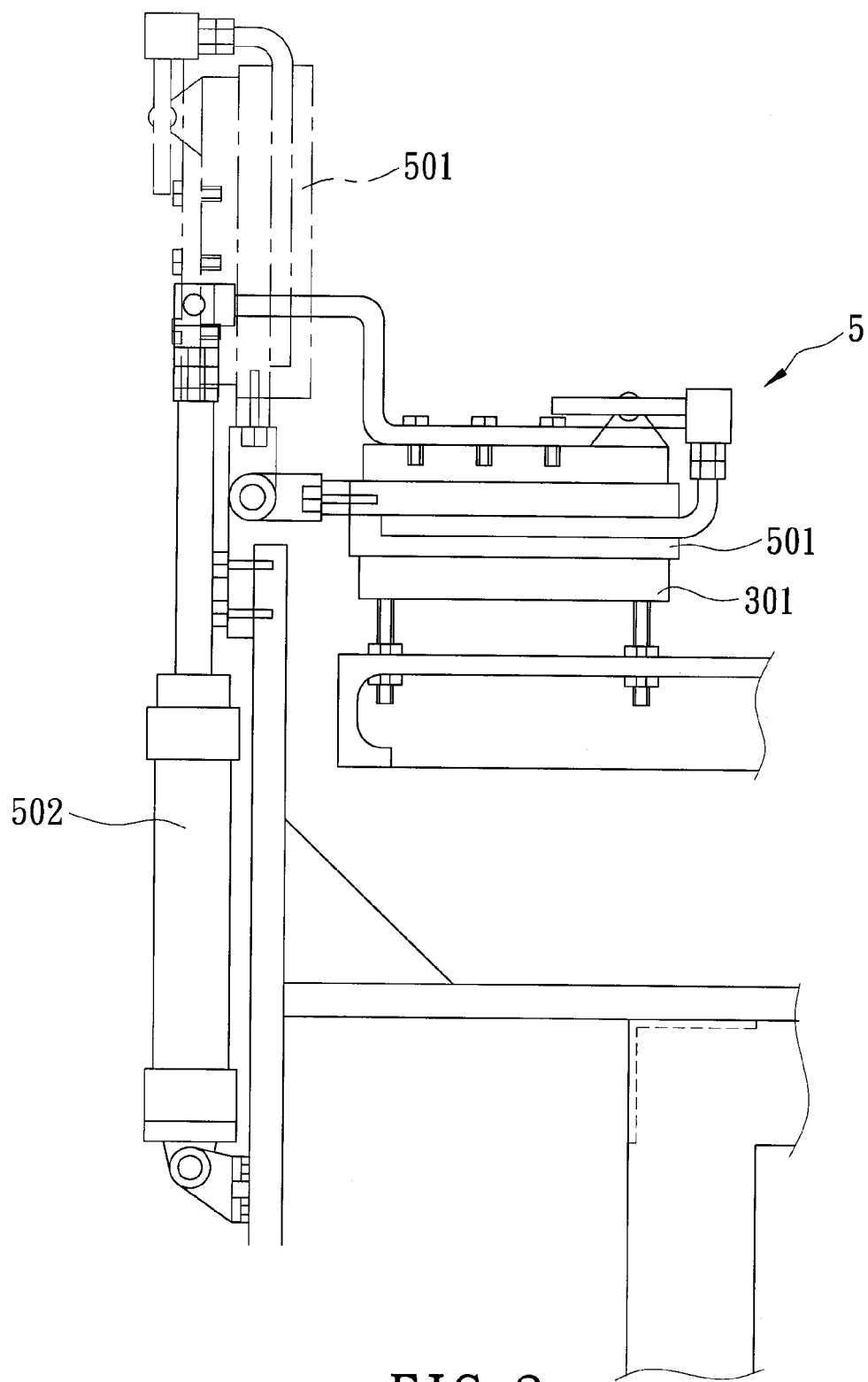
FIG. 2 is a side view of a baking unit and a lower frying tray of the conventional automatic egg roll making machine.

Referring to FIGS. 3-1, 3-2, and 4, the preferred embodiment of an automatic egg roll making machine according to this invention includes a machine bed 10, a loading device 20 disposed on the machine bed 10, a pair of material-pouring units 30 disposed adjacent to a periphery of the loading device 20, a pair of baking units 40 each disposed adjacent to the periphery of the loading device 20 and immediately downstream of a respective one of the material-pouring units 20, a pair of wrapping units 50 each disposed adjacent to the periphery of the loading device 20 and immediately downstream of a respective one of the baking units 40, and a pair of lifting units 60 aligned respectively with the wrapping units 50.

The machine bed 10 is defined to include two diametrically opposed material-pouring workstations (I), two diametrically opposed baking workstations (II) each disposed immediately downstream of a respective one of the material-pouring workstations (I), and two diametrically opposed wrapping workstations (III) each disposed immediately downstream of a respective one of the baking workstations (II).

The loading device 20 includes a rotary disk 21 disposed rotatably on and above the machine bed 10, a plurality of equidistant lower frying trays 22 disposed fixedly on a periphery of a top surface of the rotary disk 21, a driving unit 23, and a plurality of heat-insulating units 24 disposed between the rotary disk 21 and the lower frying trays 22. Each of the lower frying trays 22 is provided with a heating wire 221 therein. The driving unit 23 includes a motor 231 and a Geneva drive mechanism 232 driven by the motor 231 to rotate the rotary disk 21 intermittently in a clockwise direction (A) (see FIG. 3-1). Each of the heat-insulating units 24 includes a plurality of bakelite blocks 241 disposed fixedly on the rotary disk 21, a plurality of supporting posts 242 disposed respectively and fixedly on the bakelite blocks 241, and a loading seat 243 disposed fixedly on the support posts 242 for supporting the corresponding lower frying tray 22. With the inclusion of the heat-insulating units 24 in the machine, power consumption can be reduced. The dough material can be poured onto the two lower frying trays 22 disposed respectively at the material-pouring workstations (I) by the material-pouring units 30, respectively.

Figure 5:
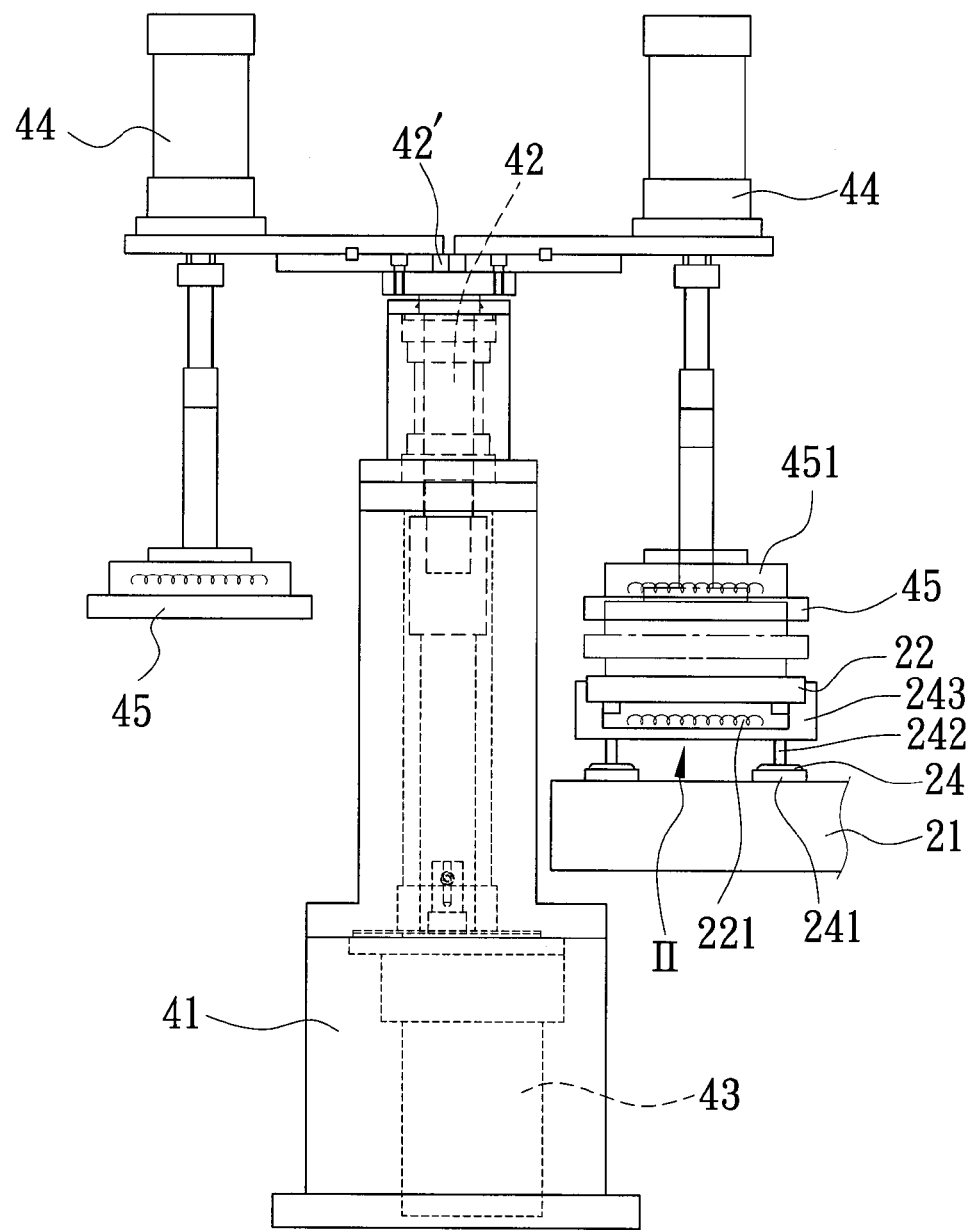
FIG. 5 is a fragmentary side view of the preferred embodiment, illustrating a baking unit.

With further reference to FIG. 5, when the two lower frying trays 22 are moved into the baking workstations (II), respectively, they are aligned with the baking units 40, respectively, so that the dough materials can be baked to form two baked dough sheets on the two lower frying trays 22, respectively. One of the baking units 40 will be described in the succeeding paragraph.

Figure 4:
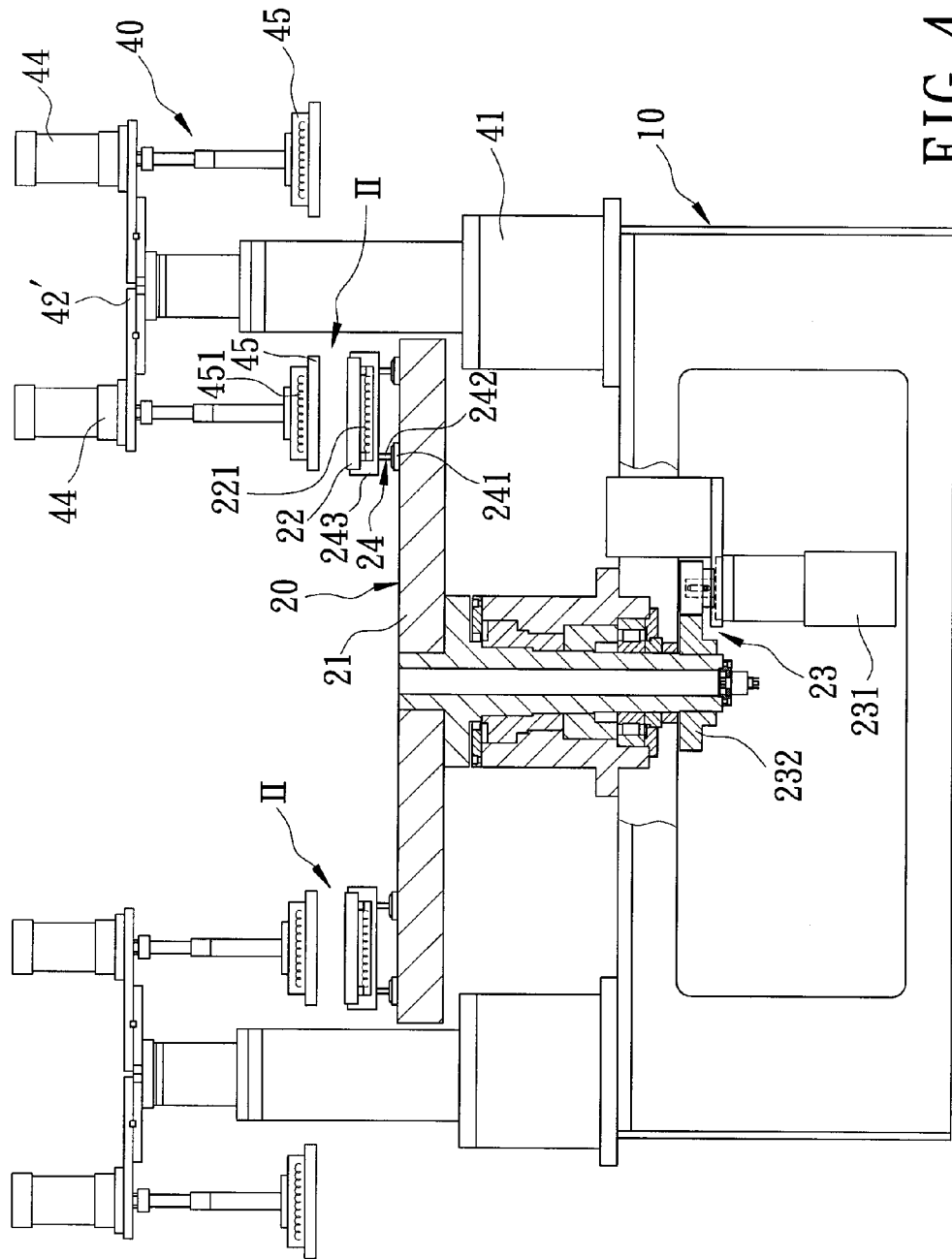
FIG. 4 is a sectional view taken along line IV-IV in FIG. 3-1.

The baking unit 40 includes a positioning seat 41 disposed fixedly on the machine bed 10, an upright rotating shaft 42 journalled within the positioning seat 41, a driving member 43 disposed within a bottom end portion of the positioning seat 41 for driving rotation of the rotating shaft 42 relative to the positioning seat 41, an elongated cylinder-mounting member 42' connected fixedly to an upper end of the rotating shaft 42, two pressure cylinders 44 disposed respectively and fixedly on and above the cylinder-mounting member 42', and two upper frying trays 45 disposed under the cylinder-mounting member 42' and located respectively at two opposite sides of the rotating shaft 42. Each of the pressure cylinders 44 is connected to a respective one of the upper frying trays 45 for driving movement of the same between a standby position shown by the solid lines in FIG. 5 whereat the corresponding upper frying tray 45 is disposed spacedly above the corresponding lower frying tray 22, and a working position shown by the phantom lines in FIG. 5 whereat the corresponding upper frying tray 45 abuts against the corresponding lower frying tray 22 to allow for a baking operation performed on the dough material disposed between the corresponding upper and lower frying trays 45, 22. When any one of the lower frying trays 22 is rotated to a position aligned with the baking unit 40 (i.e., into the corresponding baking workstation (II), the rotating shaft 42 is rotated to a position so that one of the upper frying trays 45 is disposed at the standby position, and the other one of the upper frying trays 45 is disposed at a non-working position and outwardly of the rotary disk 21, as shown in FIG. 4. Each of the upper frying trays 45 is provided with a heating wire 451 therein. After the baking operation, the one of the upper frying trays 45 is moved from the working position to the standby position under an automatic control.

Figure 6:
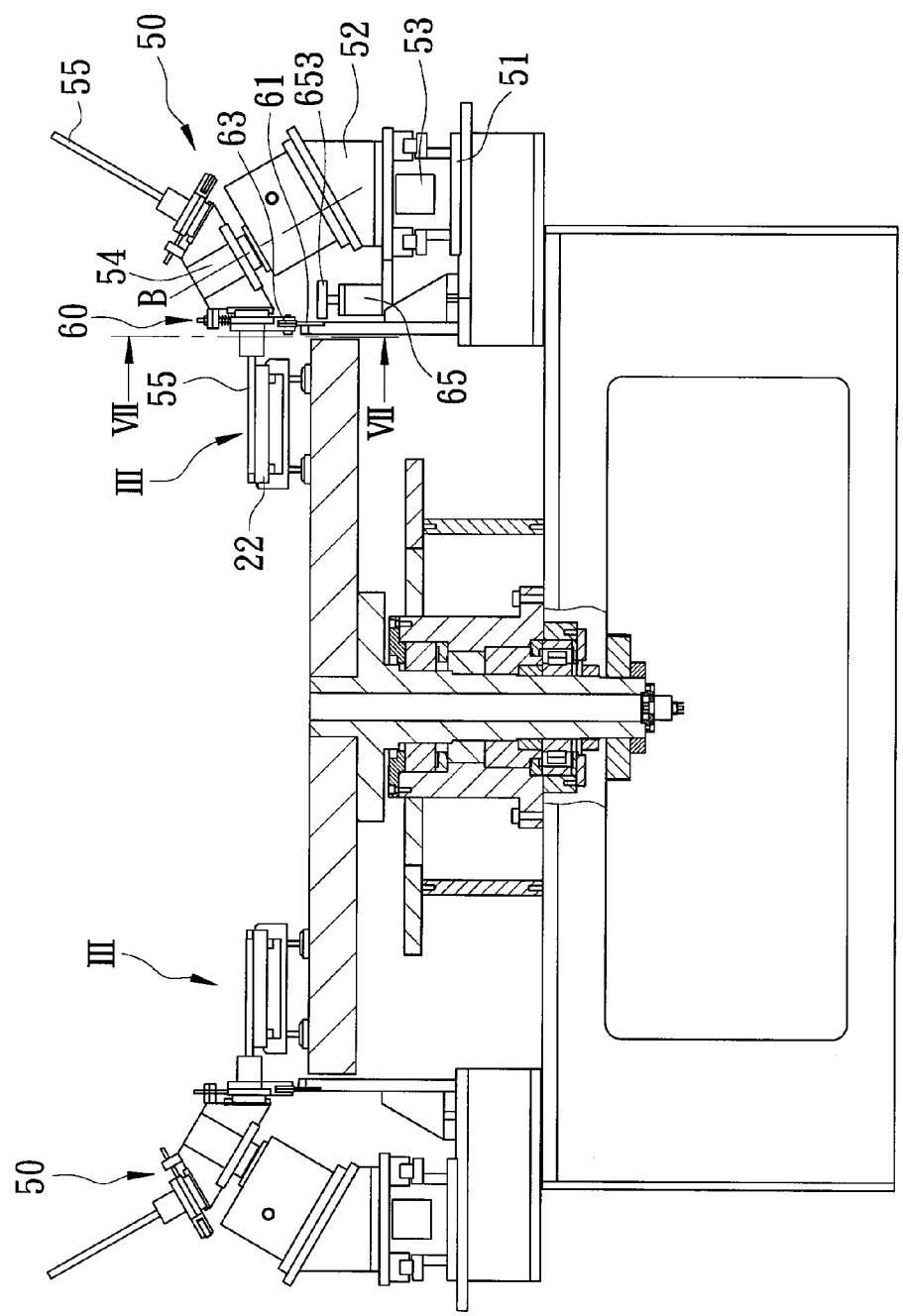
FIG. 6 is a sectional view taken along line VI-VI in FIG. 3-1.

With further reference to FIG. 6, each of the wrapping units 50 is used to perform a wrapping operation on the sheet disposed on the lower frying tray 22 at the corresponding wrapping workstation (III), so as to form an egg roll product. One of the wrapping units 50 will be described in the succeeding paragraph.

The wrapping unit 50 includes a mounting seat 51 disposed fixedly on the machine bed 10, a sliding seat 52 disposed movably on the mounting seat 51, a driving member 53 for driving the sliding seat 52 to move horizontally on the mounting seat 51, a rotating seat 54 disposed rotatably on the sliding seat 52 and rotatable about an inclined axis (B) (see FIG. 6), and a plurality of equidistant rolling rods 55 journalled on the rotating seat 54 and extending radially with respect to the inclined axis (B). The sliding seat 52 is driven by the driving member 53 to move the assembly of the sliding seat 52, the rotating seat 54, and the rolling rods 55 between a first position shown in FIGS. 3-1 and by the solid lines in FIG. 7, and a second position shown in FIGS. 3-2 and by the phantom lines in FIG. 7. During movement of assembly of the sliding seat 52, the rotating seat 54, and the rolling rods 55 from the first position to the second position, due to frictional contact between the sheet and one of the rolling rods 55, the sheet is wrapped around the one of the rolling rods 55 to form the egg roll product. The rotating seat 54 includes a dovetail tongue 541 (see FIG. 9) and a stop block 542 disposed directly above and adjacent to the dovetail tongue 541.

Figure 7:
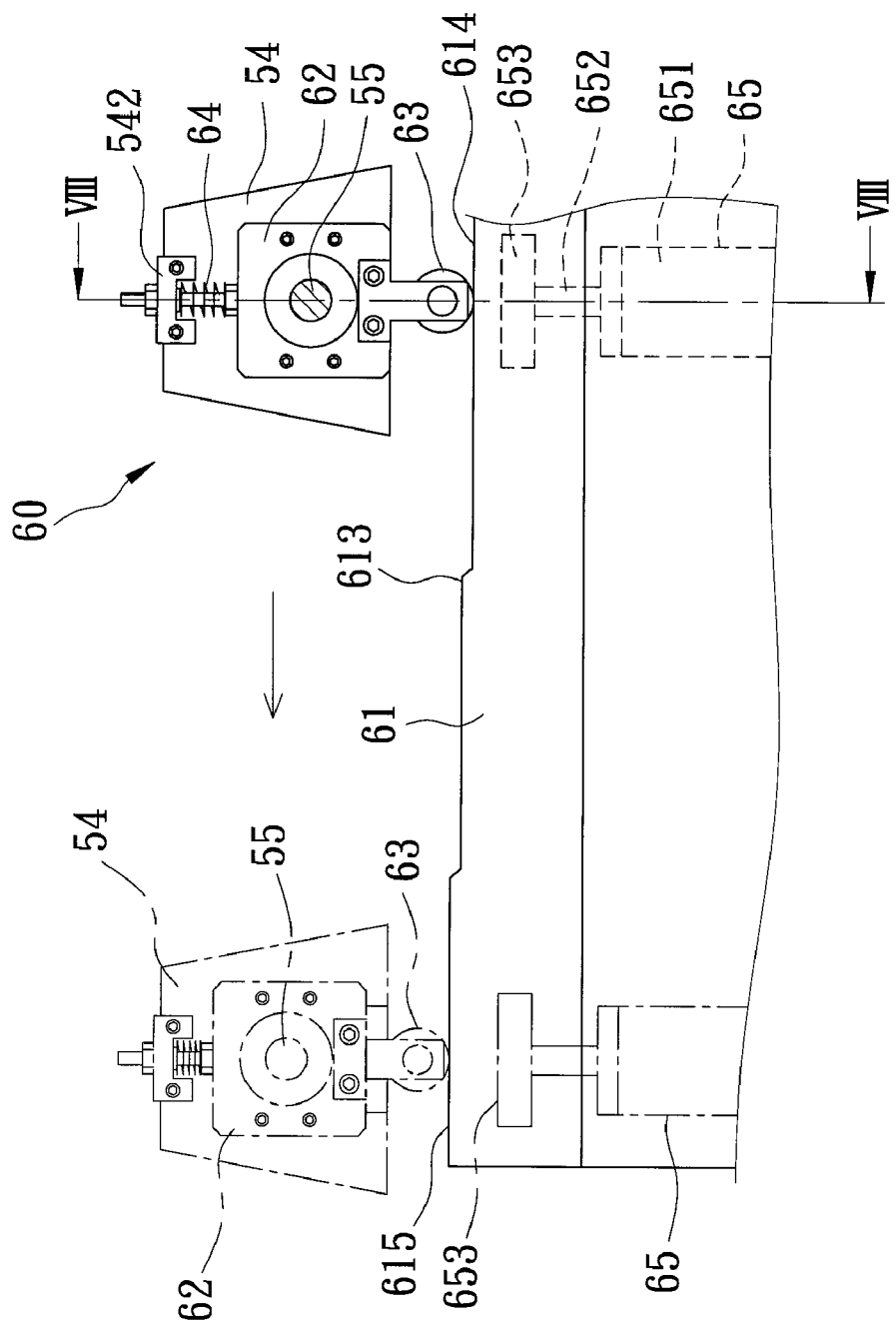
FIG. 7 is a sectional view taken along line VII-VII in FIG. 6.
Figure 8:
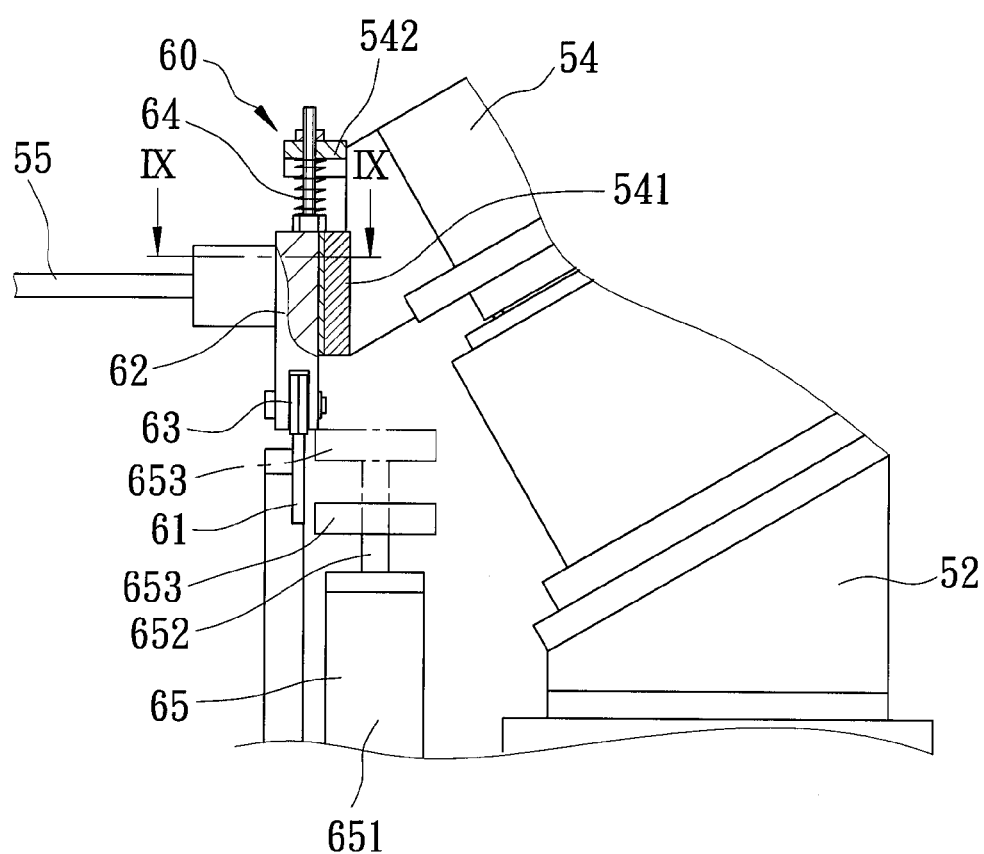
FIG. 8 is a sectional view taken along line VIII-VIII in FIG. 7.
Figure 9:
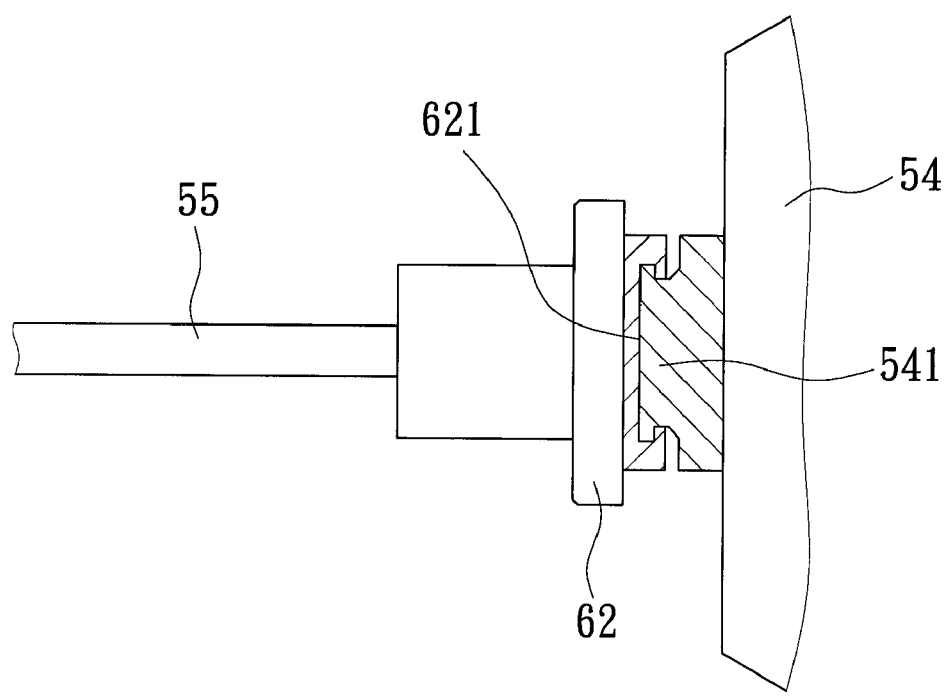
FIG. 9 is a sectional view taken along line IX-IX in FIG. 8.

With further reference to FIGS. 7, 8, and 9, one of the lifting units 60 will be described in this paragraph. The lifting unit 60 includes a guiding plate 61 disposed fixedly on the mounting seat 51, a plurality of positioning members 62 disposed slidably on the rotating seat 54 and permitting the rolling rods 55 to be journalled respectively thereon, a plurality of guiding rollers 63 disposed respectively and pivotally on bottom ends of the positioning members 62, a plurality of springs 64 for biasing the guiding rollers 63 respectively to move one of the rolling rods 55 into contact with an assembly of the sheet and one of the lower frying trays 22, and a pressure cylinder 65 disposed on the sliding seat 52 and operable for removing the one of the rolling rods 55 from the assembly of the sheet and the one of the lower frying trays 22. The guiding plate 61 has a stepped guiding surface 613. The guiding surface 613 has a first end 614 corresponding to the first position, and a second end 615 opposite to and disposed above the first end 614 and corresponding to the second position. The guiding rollers 63 are movable on the guiding surface 613 one at a time. Each of the sliding seats 62 is formed with a dovetail groove 621 engaging the dovetail tongue 541 of the corresponding rotating seat 54 to allow for vertical movement of the corresponding sliding seat 52 and, thus, the one of the rolling rods 55 relative to the rotating seat 54. Each of the springs 64 is disposed between the corresponding stop block 542 and the corresponding positioning member 62. The pressure cylinder 65 has a cylinder body 651 connected fixedly to the corresponding sliding seat 52, a piston rod 652 connected movably to and extending upwardly from the cylinder body 651, and a pushing block 653 disposed fixedly on a top end of the piston rod 652.

For convenience of illustration, operation of one of the lower frying trays 22, one of the material-pouring workstations (I), one of the baking workstations (II), one of the wrapping workstations (III), one of the material-pouring units 30, one of the baking units 40, one of the wrapping units 50, and one of the lifting units 60 will be described in the succeeding paragraphs.

Figures 1, 3:
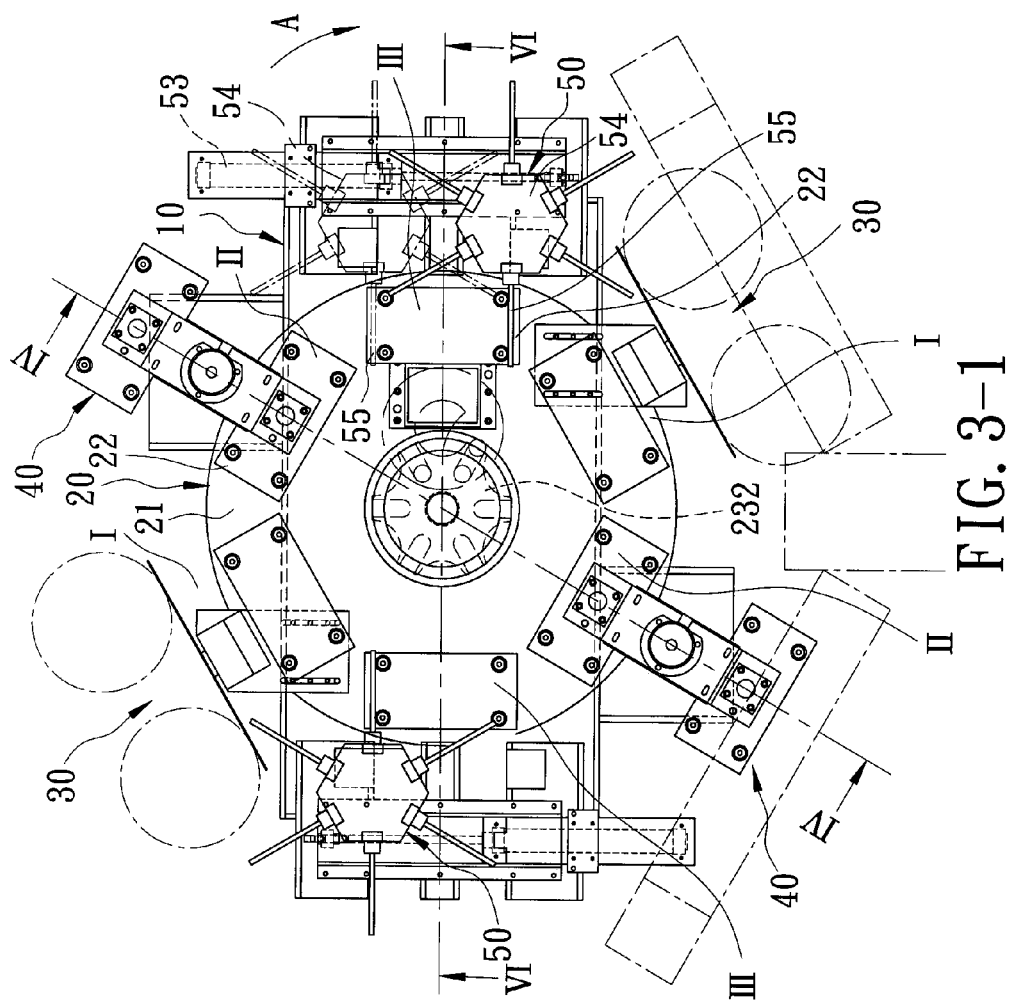

With particular reference to FIGS. 3-1 and 4, in use, upon actuation of the driving unit 23, the rotary disk 21 together with the lower frying tray 22 rotate. When the lower frying tray 22 is rotated into the material-pouring workstation (I), the rotary disk 21 is stopped, followed by pouring a dough material from the material-pouring unit 30 onto the lower frying tray 22.

The rotary disk 21 is then driven again to rotate the lower frying tray 22 into the baking workstation (II), as shown in FIGS. 4 and 5. When the lower frying tray 22 is rotated into the baking workstation (II) to align with the baking unit 40, one of the upper frying trays 45 is disposed at a standby position (shown by the solid lines in FIG. 5) directly above the lower frying tray 22, and the other one of the upper frying trays 45 is disposed at a non-working position that is misaligned from and away from the lower frying tray 22. Thereafter, the one of the upper frying trays 45 disposed directly above the lower frying tray 22 is moved downwardly by the pressure cylinder 44 to a working position (shown by the phantom lines in FIG. 5). In the working position, the one of the upper frying trays 45 abuts against the lower frying tray 22, and the heating wires 221, 451 are energized to allow the dough material disposed therebetween to be baked for a predetermined time period to thereby form a baked dough sheet. Subsequent to the formation of the sheet, the one of the upper frying trays 45 is returned to the standby position by the pressure cylinder 44.

The lower frying tray 22 loaded with the sheet is driven by the driving unit 23 into the wrapping workstation (III). In the wrapping unit (III), an assembly of the sliding seat 52, the rotating seat 54, and the rolling rods 55 is moved by the driving member 53 from the first position to the second position. Hence, the sheet is wrapped around one of the rolling rods 55 due to frictional contact therebetween, so as to form an egg roll product. Since the thickness of the egg roll is increased gradually During wrapping of the sheet around the one of the rolling rods 55, to maintain the frictional contact between the sheet and the one of the rolling rods 55, the guiding surface 613 of the guiding plate 61 is stepped, and the sliding seat 62 is biased downwardly by the spring 64 to allow the guiding roller 63 to abut against the guiding surface 613 of the guiding plate 61.

Figure 10:
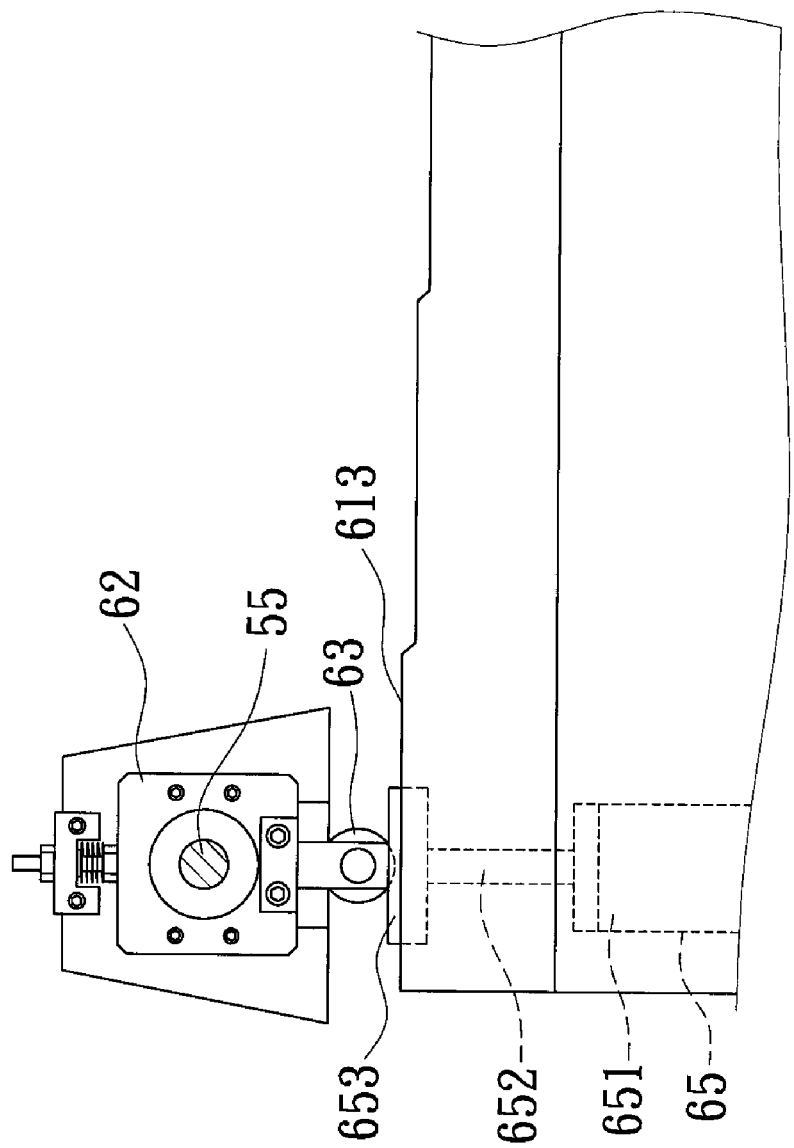
FIG. 10 is a fragmentary schematic view of the preferred embodiment, illustrating operation of a lifting device.

After the egg roll product is formed, the rotating seat 54 is rotated by 60 degrees to separate the egg roll product from the lower frying tray 22, thereby facilitating removal of the egg roll product from the one of the rolling rods 55. Subsequently, the pushing block 653 and the piston rod 652 are moved upwardly away from the cylinder body 651 to remove the guiding roller 63 from the guiding surface 613, as shown in FIG. 10, and the assembly of the sliding seat 52, the rotating shaft 54, and the rolling rods 55 is returned from the second position to the first position. As such, contact between the lower frying tray 22 and the rolling rods 55 can be prevented during movement of the assembly of the sliding seat 52, the rotating seat 54, and the rolling rods 55 from the second position to the first position. When the assembly of the sliding seat 52, the rotating shaft 54, and the rolling rods 55 reaches the first position, the pushing block 653 and the piston rod 652 are moved downwardly toward the cylinder body 651 so that the guiding roller 63 is biased by the spring 64 to move into contact with the guiding surface 613, thereby allowing for a subsequent egg roll making operation.

During rotation of any of the lower frying trays 22 from one of the baking units 40 into the other one of the baking units 40, for each of the baking units 40, the rotating shaft 42 is driven to exchange the positions of the upper frying trays 45, so that baked dough stuck on either of the upper frying trays 45 can be easily removed.

In view of the above, by cooperation of the loading device 20 with the material-pouring units 30, the baking units 40, and the wrapping units 50 under an automatic control, a fully automatic egg roll making process can be performed. Furthermore, since each of the baking units 40 includes two upper frying trays 45 that can be used alternately for baking, during a baking operation, one of the upper frying trays 45 is disposed at the non-working position and outwardly of the rotary disk 21, and can be cleaned easily and conveniently without interrupting the egg roll making operation, thereby promoting the production capacity of the machine. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A fully automatic egg roll making machine comprising:
   a machine bed;
   a loading device including a rotary disk disposed rotatably on said machine bed, a plurality of equidistant lower frying trays disposed on said rotary disk, and a driving unit operable for driving intermittent rotation of said rotary disk on said machine bed in a predetermined direction;
   a material-pouring unit disposed adjacent to a periphery of said rotary disk for pouring a dough material onto one of said lower frying trays when the one of said lower frying trays is rotated relative to said machine bed to a position aligned with said material-pouring unit;
   a baking unit disposed adjacent to said periphery of said rotary disk and immediately downstream of said material-pouring unit for baking the dough material on the one of said lower frying trays to form a baked dough sheet when the one of said lower frying trays is rotated relative to said machine bed to be aligned with said baking unit, said baking unit including two upper frying trays rotatable relative to said machine bed such that, when the one of said lower frying trays is rotated to a position aligned with said baking unit, one of said upper frying trays is rotated to a standby position disposed directly above the one of said lower frying trays to subsequently move to a working position so as to abut against the one of said lower frying trays to thereby allow the dough material to be baked, thus forming the baked dough sheet, after which the one of said upper frying trays is returned to the standby position, and the other one of said upper frying trays is rotated to a non-working position that is misaligned from and away from the one of said lower frying trays; and
   a wrapping unit disposed adjacent to said periphery of said rotary disk and immediately downstream of said baking unit and operable to allow said sheet to form an egg roll product when the one of said lower frying trays is rotated relative to said machine bed to a position aligned with said wrapping unit.

2. The fully automatic egg roll making machine as claimed in claim 1, wherein said baking unit further includes a positioning seat disposed fixedly on said machine bed, and an upright rotating shaft journalled within said positioning seat, said upper frying trays being disposed respectively at two opposite sides of said rotating shaft.

3. The fully automatic egg roll making machine as claimed in claim 2, wherein said baking unit further includes a driving member for driving rotation of said rotating shaft relative to said positioning seat.

4. The fully automatic egg roll making machine as claimed in claim 3, wherein said baking unit further includes a cylinder-mounting member connected fixedly to an upper end of said rotating shaft, and two pressure cylinders each disposed on said cylinder-mounting member for driving movement of a respective one of said upper frying trays between said standby position and said working position.

5. The fully automatic egg roll making machine as claimed in claim 1, wherein said driving unit includes a Geneva drive mechanism for driving intermittent rotation of said rotary disk relative to said machine bed, and a motor for driving said Geneva drive mechanism.

6. The fully automatic egg roll making machine as claimed in claim 1, wherein said loading device further includes a plurality of heat-insulating units disposed between said rotary disk and said lower frying trays, each of said heat-insulating units including a plurality of bakelite blocks disposed fixedly on said rotary disk, a plurality of supporting posts disposed respectively and fixedly on said bakelite blocks, and a loading seat disposed fixedly on said supporting posts for supporting a corresponding one of said lower frying trays.

7. The fully automatic egg roll making machine as claimed in claim 1, wherein each of said upper frying trays is disposed outwardly of said rotary disk when at the non-working position.

8. The fully automatic egg roll making machine as claimed in claim 1, wherein said wrapping unit includes:
 a mounting seat disposed fixedly on said machine bed;
 a sliding seat disposed movably on said mounting seat;
 a driving member for driving said sliding seat to move horizontally on said mounting seat;
 a rotating seat disposed rotatably on said sliding seat and rotatable about an inclined axis, said rotating seat being co-movable with said sliding seat relative to said mounting seat; and
 a plurality of equidistant rolling rods journalled on said rotating seat and extending radially with respect to the inclined axis such that an assembly of said sliding seat, said rotating seat, and said rolling rods is movable relative to said mounting seat between first and second positions, movement of the assembly of said sliding seat, said rotating seat, and said rolling rods from the first position to the second position resulting in formation of the egg roll product from said sheet when said sheet is in frictional contact with one of said rolling rods.

9. The fully automatic egg roll making machine as claimed in claim 8, further comprising a lifting unit that includes:
 a guiding plate disposed fixedly on said mounting seat and having a stepped guiding surface, said guiding surface having a first end corresponding to the first position, and a second end opposite to and disposed above said first end and corresponding to the second position;
 a plurality of positioning members disposed slidably on said rotating seat and permitting said rolling rods to be disposed journalled respectively thereon;
 a plurality of guiding rollers disposed respectively and pivotally on bottom ends of said positioning members, said guiding rollers being movable on said guiding surface one at a time; and
 a plurality of springs for biasing said guiding rollers respectively to move the one of said rolling rods into contact with an assembly of said sheet and the one of said lower frying trays.

10. The fully automatic egg roll making machine as claimed in claim 9, wherein said lifting unit further includes a pressure cylinder disposed on said sliding seat and operable for removing the one of said rolling rods from the one of said lower frying trays just before the assembly of said sliding seat, said rotating seat, and said rolling rods is moved from said second position to said first position.

* * * * *